US006289441B1

(12) United States Patent
Talcott et al.

(10) Patent No.: US 6,289,441 B1
(45) Date of Patent: Sep. 11, 2001

(54) METHOD AND APPARATUS FOR PERFORMING MULTIPLE BRANCH PREDICTIONS PER CYCLE

(75) Inventors: Adam R. Talcott, San Jose; Ramesh K. Panwar, Santa Clara; Rajasekhar Cherabuddi, Cupertino; Sanjay Patel, Fremont, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/005,076

(22) Filed: Jan. 9, 1998

(51) Int. Cl.[7] ................................................ G06F 9/38
(52) U.S. Cl. .................................. 712/239; 712/240
(58) Field of Search .................................. 712/237, 238, 712/239, 240

(56) References Cited

U.S. PATENT DOCUMENTS

| | | | |
|---|---|---|---|
| 4,679,141 | * 7/1987 | Pomerene et al. | 712/240 |
| 5,276,882 | * 1/1994 | Emma et al. | 712/240 |
| 5,394,529 | 2/1995 | Brown, III et al. . | |
| 5,504,870 | * 4/1996 | Mori et al. | 712/238 |
| 5,560,032 | 9/1996 | Nguyen et al. . | |
| 5,574,871 | * 11/1996 | Hoyt et al. | 712/200 |
| 5,604,877 | 2/1997 | Hoyt et al. . | |
| 5,649,178 | * 7/1997 | Blaner et al. | 712/240 |
| 5,687,338 | * 11/1997 | Boggs et al. | 712/205 |
| 5,758,112 | * 5/1998 | Yeager et al. | 712/217 |
| 5,796,998 | * 8/1998 | Levitan et al. | 712/239 |
| 5,854,761 | * 12/1998 | Patel et al. | 365/49 |
| 5,857,098 | * 1/1999 | Talcott et al. | 712/240 |
| 5,870,599 | * 2/1999 | Hinton et al. | 712/239 |
| 5,875,325 | * 2/1999 | Talcott | 712/240 |

OTHER PUBLICATIONS

Yeh et al., "A Comprehensive Instruction Fetch Mechanism for a Processor Supporting Speculative Execution," Proceedings of the 25th Annual International Symposium on Microarchitecture, Micro 25, IEEE, pp. 129–139, Dec. 1–4, 1992.*

* cited by examiner

Primary Examiner—William M. Treat
(74) Attorney, Agent, or Firm—Townsend and Townsend and Crew LLP

(57) ABSTRACT

A method and apparatus for performing multiple branch predictions per cycle is disclosed. The method and apparatus according to the present invention determine, within one fetch cycle, which instructions in a plurality of fetch instructions are branches and whether such branches are taken or not taken thereby finding the oldest taken branch, which has a target address that is fetched within the same fetch cycle.

19 Claims, 7 Drawing Sheets

$$T_n = P_n \cdot B_n \Longrightarrow \text{Branch Logic Summary Equation}$$

| NFA0 | NFA1 | Next Address |
|---|---|---|
| No Taken Branch | No Taken Branch | Sequential Address |
| N.T.B. | T.B. | NFA1 |
| T.B. | N.T.B. | NFA0 |
| T.B. | T.B. | NFA0 |

| If1 | If2 | If3 | If4 | If5/Rn1 |
|---|---|---|---|---|
| NFAT Rd<br>Speculative Predecode Rd<br>BIT available | Speculative BHR Wr<br>Rd Address at Top Of RAS<br>Agen (NFAT/RAS/If1)<br>I$ Addr Decode<br>PTAG Addr Decode<br>uTLB Addr Decode | I$ Rd Begins (Agen/If2)<br>I$ Physical Tag Rd<br>BPT Rd Starts<br>STB Probe<br>Predecode Array Rd<br>non-speculative | I$ Rd Completes (Agen/If2)<br>BPT Rd completes<br>Fetch Bundle Alignment ($ Rd/If4)<br>RAS Pop/TopOfRAS Update (If1)<br>RAS Wr/Push<br>uTLB Rd<br>Speculative Predecode Wr<br>Predecode Mispred. Detection<br>Agen (Predecode Mispre/If4d) | PC-Rel Br Addr Comp<br>I$ Tag Comparison<br>I$ Miss Detection<br>Request to L2$ on I$ Miss (I$/If5) |

*FIG. 5A*

| If6/Rn2 | Rn3 | Is1 | Is2 | Op1 |
|---|---|---|---|---|
| PC-Rel Br. Mis. Det. (NFAT/If1)<br>NFAT Wr(PC-Rel/If5)<br>BRT Entry Wr<br>Agen (PC-Rel Mispred/If6)<br>↳ Opcode-based address. | | | | |

FIG. 5B

METHOD AND APPARATUS FOR PERFORMING MULTIPLE BRANCH PREDICTIONS PER CYCLE

BACKGROUND OF THE INVENTION

The present invention relates to the field of microprocessor architecture. Specifically, the invention relates to a method and apparatus for performing multiple branch predictions per cycle.

Reduced instruction set computers, commonly referred to as RISC processors, are one of the more common computer architectures in use today. In a nutshell, RISC processors rely on simple, low level instructions of the same size. Instruction execution is broken up into various segments and processed in a multistage pipeline. The pipeline is structured such that multiple instructions may be processed at any given instant. For example, a five-stage pipeline may include separate stages for fetching an instruction from memory (instruction fetch stage), decoding the instruction (decode stage), fetching operands the instruction needs (operand fetch stage), executing the instruction (execution stage) and writing the results back to the appropriate register or memory location (write back stage). Since each stage can process an instruction and there are five stages, up to five instructions can be processed at once in such a pipeline.

Thus, such a RISC computer can theoretically achieve performance equivalent to executing one instruction per clock cycle. To achieve higher performance standards, however, more than one instruction needs to be processed in each stage. This higher standard of performance can be achieved by superscalar processors. Superscalar processors are generally based on RISC architecture and incorporate multiple instruction pipelines. For example, one superscalar processor, the Ultrasparc manufactured by SUN Microsystems, includes six separate instruction pipelines: two for floating point calculations/graphics operations, two for integer calculations, one for branch operations and one for memory operations. Theoretically, a superscalar processor having six separate pipelines can process up to six instructions per clock cycle.

One limiting factor as to how many instructions can be processed per clock cycle in RISC, superscalar and other processors that employ instruction pipelines is branch instructions. When a processor executes code containing a branch instruction, the earliest the processor could possibly recognize that the branch is to be taken is at the instruction decode stage. At this point, however, the next instruction has already been fetched and possibly other actions have been taken. Thus, the fetched instruction and other actions must be discarded and a new instruction (the branch target) must be fetched. This problem is compounded because branches are common occurrences. Studies have shown that branch instructions generally occur about as often as once every five to ten instructions.

One way designers have addressed the branch problem is to implement elaborate schemes to predict whether a branch is likely to be taken and then fetch the branch target address as the next instruction rather than the next sequential instruction as appropriate. One such method is as described in Yeh Tse-Yu's Ph.D Dissertation: "Two level Adaptive Branch Prediction and Instruction Fetch Mechanisms for High Performance Superscalar Processors." A drawback to this method, however, is that only one branch instruction is predicted per fetch cycle. While this may be acceptable for a microprocessor with a limited number of pipelines, as the number of pipelines increases, there is a greater chance of multiple branch instructions being processed in one fetch cycle.

SUMMARY OF THE INVENTION

The present invention offers a method and apparatus for performing multiple branch predictions per fetch cycle. This allows a superscalar design with a large number of pipelines to avoid stalls when there are multiple branch instructions in a fetch bundle. A branch prediction table is configured to provide multiple predictions in parallel, and a branch handling unit is provided, which can process several branch instructions in parallel.

In a preferred embodiment according to the present invention, a microprocessor for handling multiple branch predictions per cycle includes an instruction cache for providing a current fetch bundle having a plurality of fetch instructions, a predecode array for determining which ones, if any, of the fetch instructions are branches and a branch prediction table for predicting which ones, if any, of the branch instructions are taken. The microprocessor also includes a branch logic (the term used in the figures to denote the branch handling unit) that combines the information from the predecode array and the predictions from the branch prediction table to identify the oldest taken branch, and a next fetch address table that provides the target address corresponding to the oldest taken branch.

A better understanding of the nature and advantages of the present invention may be achieved by a perusal of the detailed description with reference to the drawings.

DESCRIPTION OF SPECIFIC EMBODIMENTS

Figure 1:
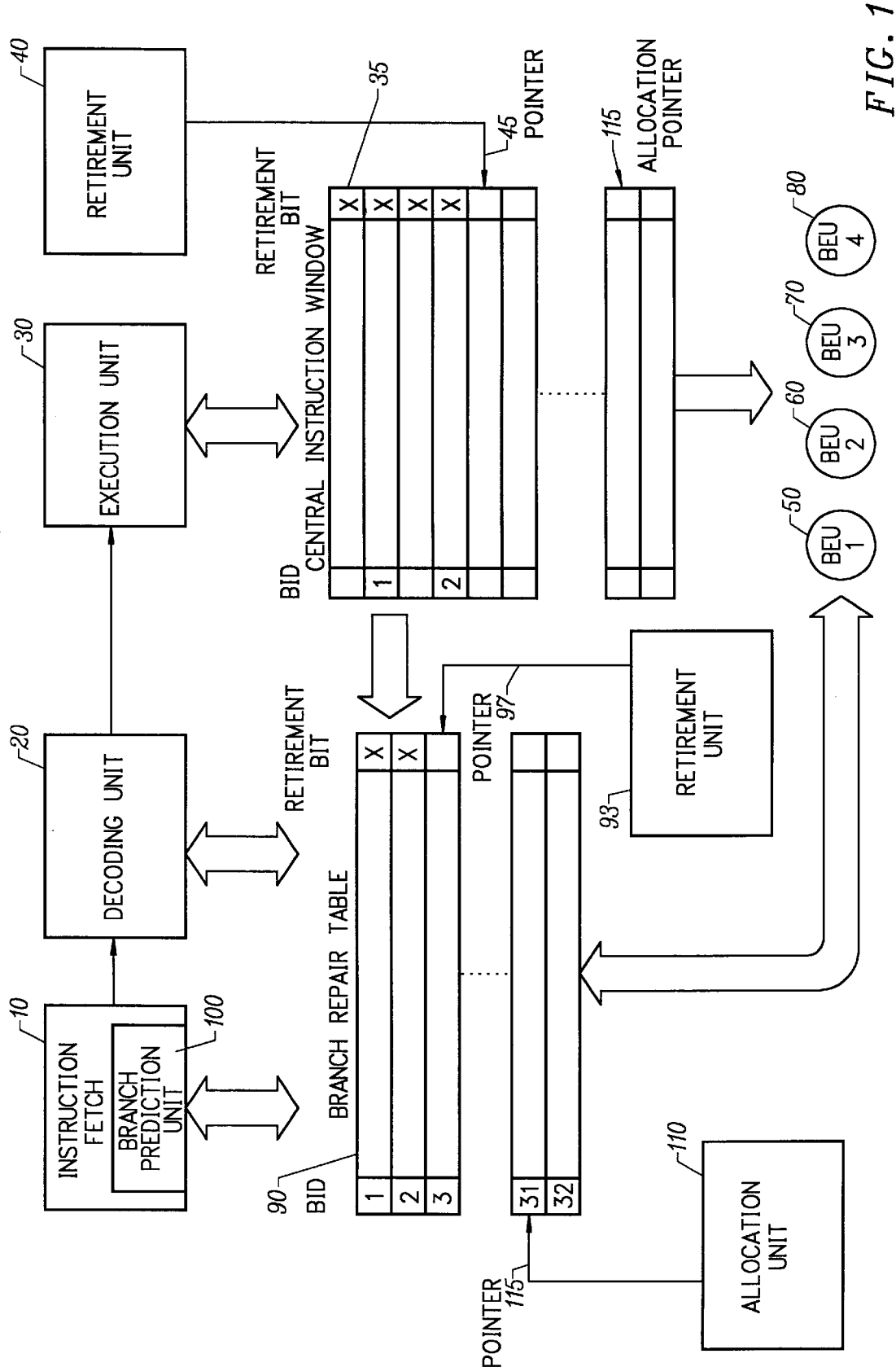
FIG. 1 shows a block diagram of a processor incorporating an embodiment of the present invention.

FIG. 1 shows a block diagram of a processor that incorporates an embodiment of the present invention. As shown, FIG. 1 includes an instruction fetch unit 10, an instruction decoding unit 20, an execution unit 30, a retirement unit 40, branch execution units (BEUs) 50–80, and a branch repair table (BRT) 90. Instruction fetch unit 10 includes a branch prediction unit 100. Execution unit 30 has an associated central instruction window (CIW) 35. Retirement unit 40 provides a retirement pointer 45. BRT 90 has an associated retirement unit 93 providing a retirement pointer 97, and associated allocation unit 110 providing an allocation pointer 115. A more detailed description of FIG. 1 and the functions of its various components may be found in copending application "METHOD AND APPARATUS FOR RESOLVING MULTIPLE BRANCHES," Ser. No. 09/004,971. filed on Jan. 9, 1998, and assigned to the same assignee. Application Ser. No. 09/004,971 is hereby incorporated by reference for all purposes.

Figure 2:
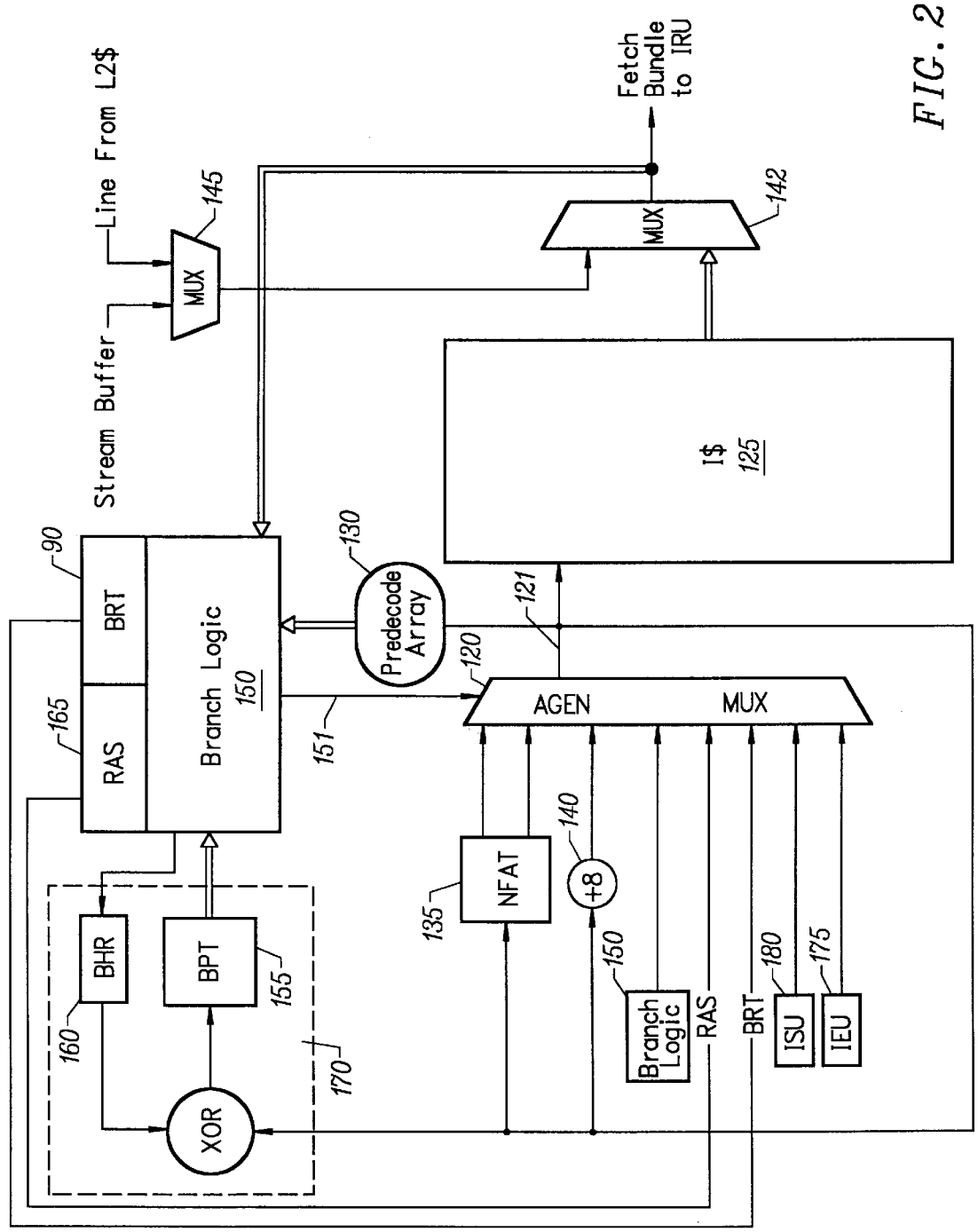
FIG. 2 shows a block diagram of a circuit for performing multiple branch predictions according to the present invention.

FIG. 2 shows a block diagram of a portion of instruction fetch unit 10 including BPU 100, and the instruction cache. As shown, multiplexer address generator (AGEN) 120 supplies a current fetch address via line 121 to instruction cache (I$) 125. The current fetch address is an index address that corresponds to an instruction in I$ 125. For clarification purposes, this instruction will be referred as the current fetch instruction. In a preferred embodiment, I$ 125 will locate the current fetch instruction and supply the instruction, along with the next seven instructions in the instruction cache, to multiplexer (MUX) 142. This approach is described in copending applications "CACHE MEMORY ARRAY WHICH STORES TWO-WAY SET ASSOCIATIVE DATA," U.S. Pat. No. 5,854,761, and "METHOD FOR STORING DATA IN TWO-WAY SET ASSOCIATIVE ADD AND EVEN BANKS OF A CACHE MEMORY," Ser. No. 08/883,543 both filed on Jun. 26, 1997, and assigned to the same assignee. Application Ser. No. 08/883,543 is hereby incorporated by reference for all purposes.

The eight fetch instructions supplied by I$ 125 are grouped as a current fetch bundle that is supplied to branch logic 150 and to the instruction rename unit (IRU, not shown). In other embodiments, I$ 125 may supply sixteen or more instructions, instead of eight instructions, to MUX 142. Hence, although the current fetch bundle typically includes eight fetch instructions, it may include sixteen or more instructions in other embodiments. The current fetch bundle may include one or more branch instructions. Although this is rare, all the fetch instructions in the current fetch bundle may be branch instructions.

As shown in FIG. 2, MUX 142 may also receive data or instructions from the stream buffer or the level 2 cache (L2$) line. This typically occurs when there is an I$ miss, that is, when the instruction corresponding to the current fetch address could not be found in the I$. When the current fetch instruction is located either from the stream buffer or the L2$, the current fetch instruction and the next seven or fifteen or more instructions will be written to the I$. At the same time, the predecode array information corresponding to these instructions will be computed, supplied to and stored in predecode array 130. As can be seen, MUX 145 determines whether the stream buffer or level 2 cache line instructions or data is supplied to MUX 142.

Referring to FIG. 2, it can be seen that the current fetch address is also supplied to predecode array 130, next fetch address table (NFAT) 135, sequential addresser (+8) 140, and branch prediction sub-unit 170. As discussed, predecode array 130 contains information regarding the instructions; these information are in the form of bit entries. Since the current fetch address serves as an index address, predecode array 130 will locate the bit entry corresponding to the index address and supply this bit entry and the next seven bit entries, in parallel, to branch logic 150. These eight bit entries indicate which fetch instructions in the current fetch bundle are branch instructions, whether such branches are conditional or unconditional branches, and whether any of the branch instructions are return instructions. Since predecode array 130 is accessed in parallel with I$ 125, information on the fetch instructions is made available to branch logic 150 before I$ 125 provides the instructions in the current fetch bundle.

Branch prediction sub-unit 170 includes branch history register (BHR) 165, an exclusive OR (XOR) logic unit, and branch prediction table 155. As shown in FIG. 2, the current fetch address is "XORed" with an input from BHR 160 to yield a bit wise result that serves as an index for accessing BPT 155. BPT 155 will supply the counter value corresponding to the index, along with several counter values following the corresponding counter value to branch logic 150. BPT 155 preferably supplies four two-bit counter values, in parallel, to branch logic 150; although it may provide more than four counter values in other embodiments. If the counter from BPT 155 has a value of 0 or 1, this indicates that the instruction(s) corresponding to the counter, if it is a branch, is not taken. On the other hand, if the counter has a value of 2 or 3, this indicates that the instruction(s) corresponding to the counter, if it is a branch, is taken.

In a preferred embodiment, each of the BPT counters corresponds to two instructions within the current fetch bundle. This typically corresponds to the SPARC instruction set architecture or an instruction sets with delay branches. The assumption here is that no two consecutive fetch instructions will be branches, hence, only four counters are needed. Although it is possible that two consecutive fetch instructions may both be branches, this occurrence is rare. Hence, the assumption is sufficiently accurate. Of course, greater accuracy may be achieved if BPT 155 provides eight counters, each corresponding to an instruction in the fetch bundle; however, this likely means increased hardware cost, which may not be warranted for many of the applications. BPT 155, BHR 160, and logic function XOR are part of a branch predictor that updates the prediction information in BPT 155 in accordance with the gshare mechanism originally described by McFarling. Although the gshare mechanism is illustrated in FIG. 2, any branch predictor may be used in combination with the present invention.

As discussed, branch logic 150 is capable of receiving multiple fetch instructions (in parallel) from the current fetch bundle, multiple counters (in parallel) from BPT 155, and multiple bit entries (in parallel) from predecode array 130. Branch logic 150 also controls and maintains return address stack (RAS) 165 and BRT 90. BRT 90 stores predictions from BPT 155, and tracks unresolved branches. Once the branch's actual outcome is computed by the integer execution unit (IEU) 175 or the branch target address adders (not shown), BRT 90 will repair any mispredictions. These branches may be resolved out of program order, and BRT 90 will subsequently provide the correct address to AGEN 120. BRT's repair functions are described in greater detail in previously mentioned co-pending application "METHOD AND APPARATUS FOR RESOLVING MULTIPLE BRANCHES."

Referring to FIG. 2, AGEN 120 receives addresses from BRT 90, NFAT 135, sequential addresser 140, branch logic 150, RAS 165, trap addresser (IEU) 175, and ISU 180. Branch logic 150 supplies the select input 151 of AGEN 120, hence, branch logic 150 controls whether an address from NFAT 135, sequential addresser 140, RAS 165, BRT 90, IEU 175, ISU 180 or branch logic 150 itself is selected by AGEN 120 to be supplied to I$ 125. If branch logic 150 does not detect any predicted taken branches in the current fetch bundle, and there are no pending traps or mispredicted branches needing repair, sequential addresser 140 is selected by select input 151 to AGEN 120. If BPT 155 indicates a taken branch instruction in the fetch bundle, the NFAT entry corresponding to the oldest predicted taken branch instruction in the fetch bundle (this is described in greater detail in FIG. 4) is selected by select input 151 and is provided to I$ 125.

Figure 3:
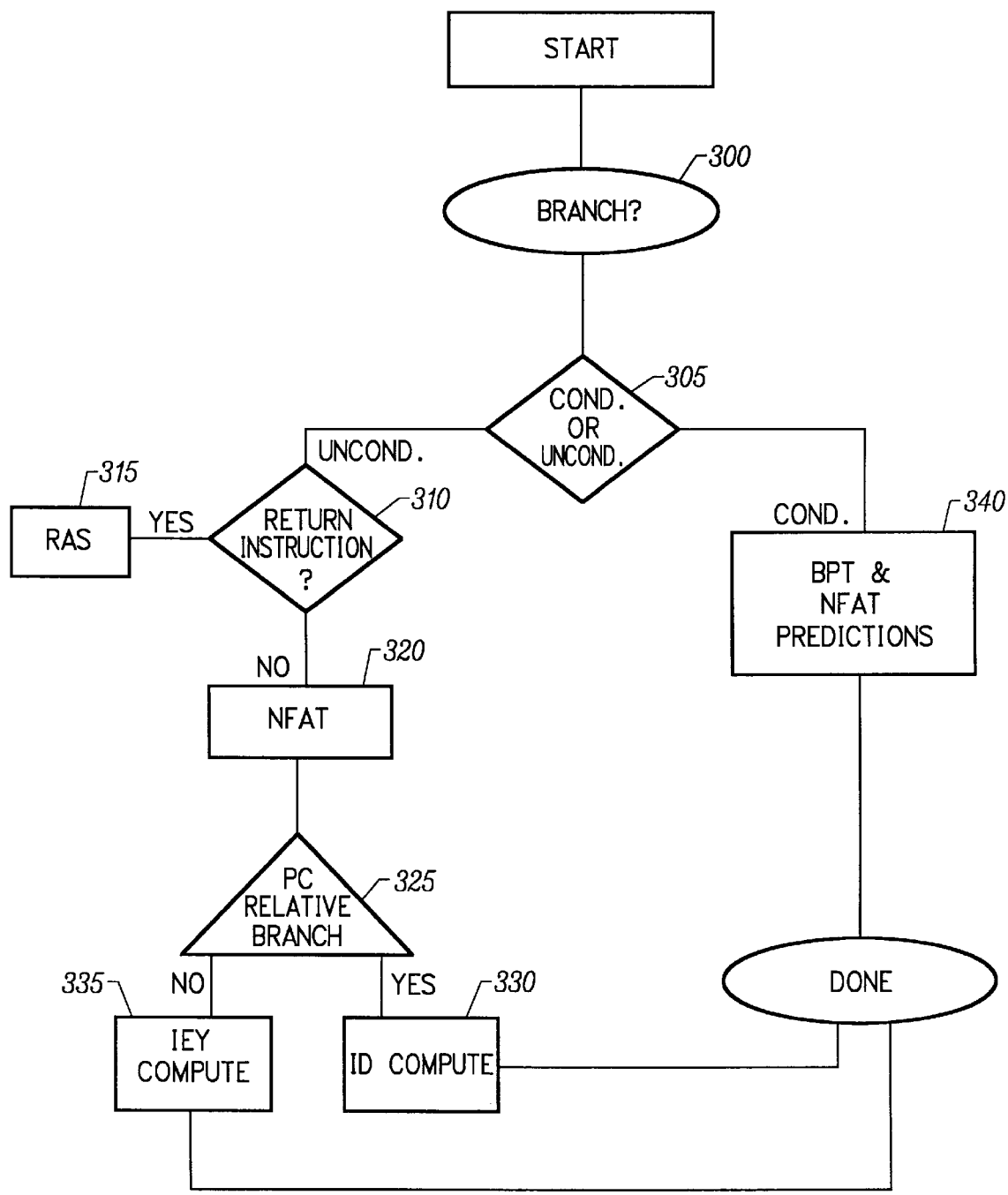
FIG. 3 shows a flow chart of the branch prediction logic for a single branch.

Referring to FIG. 3, which shows a flow chart of the branch prediction logic for a single branch, branch logic 150 first determines whether the instruction is a branch (step 300). If so, branch logic 150 determines whether the branch is conditional or unconditional based on information supplied by predecode array 130 (step 305). If the branch is unconditional, branch logic 150 determines whether the instruction is a return instruction (step 310). If so, branch logic 150 supplies a select input via input 151 to supply the return address on top of RAS 165 to AGEN 120, and this return address is subsequently supplied to I$ 125 (step 315).

If the branch is not a return address instruction, branch logic 150 will cause the appropriate (this will be explained in FIG. 4) next fetch address to be fetched from NFAT 135 (step 320). This is because an unconditional branch is always taken. This NFAT predicted target address will also be supplied to AGEN 120 and subsequently to I$ 125. Branch logic 150 determines if an instruction is a PC relative branch (step 325), and if so, an instruction decoder computes the actual address at step 330. If the instruction is not a PC relative branch, IEU 180 computes the actual address at step 335. If the branch is a conditional branch, BPT 155 predicts whether the branch is taken or not taken, and if the branch is taken, NFAT 135 supplies the predicted target next fetch address at step 340. The NFAT predicted target address will be supplied to AGEN 120, and subsequently to I$ 125.

Figures 4A, 4B:
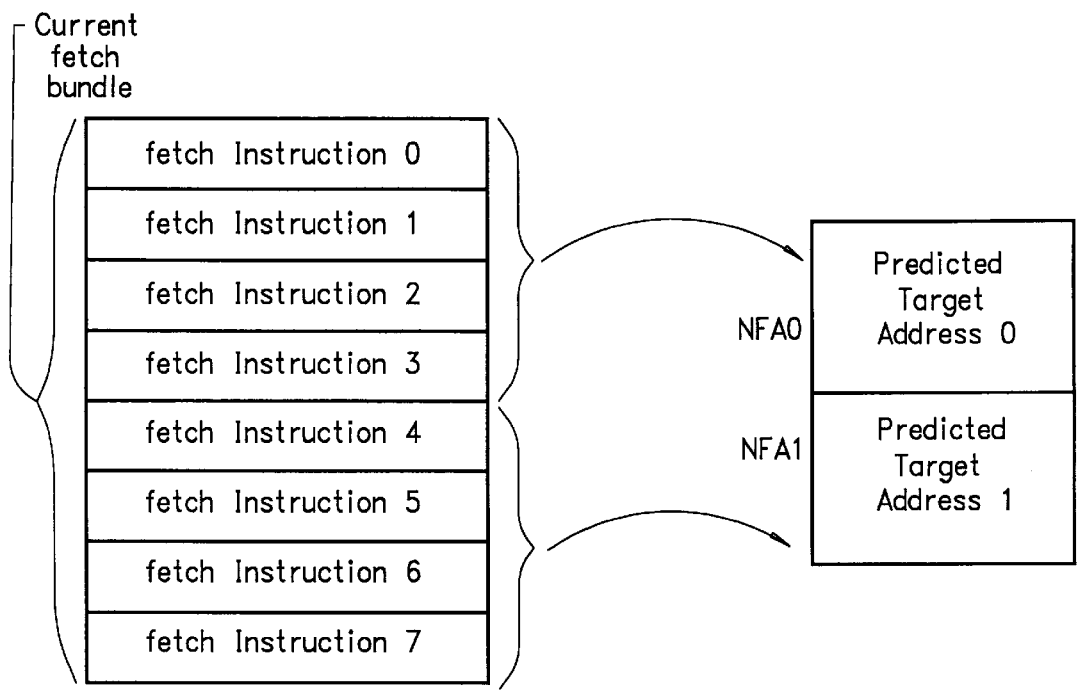
FIGS. 4A–4B show in tabular forms the branch prediction logic for multiple branches according to the present invention.

FIGS. 4A–4B show in tabular forms the branch prediction logic for multiple branches according to the present invention. Referring to FIG. 2, NFAT 135 supplies two addresses to AGEN 120, although it may supply more addresses to AGEN 120 in other embodiments. For illustration purposes, these two addresses are denoted as NFA0 and NFA1 in FIG. 4A. As discussed, the current fetch bundle preferably includes eight fetch instructions. These instructions have been labeled as fetch instruction 0–7 in FIG. 4A; fetch instruction 0 being the previously discussed current fetch instruction that corresponds to the current fetch address supplied by AGEN 120 to MUX 142. As can be seen, the first four fetch instructions have NFA0 as the corresponding predicted target address, while the second four fetch instructions have NFA1 as the corresponding predicted target address. This is known as aliasing. In the SPARC instruction architecture, there are typically no more than two branches in every four fetch instructions. Hence, this kind of aliasing provides an acceptable performance trade-off. If necessary, NFAT 135 may supply more than two next fetch addresses to AGEN 120. Hence, while four fetch instructions are shown to correspond to one predicted target address, if NFAT 135 supplies four next fetch addresses to predecode array 130, for example, two fetch instructions would correspond to one predicted target address.

Referring to FIG. 4B, the logic employed by branch logic 150 in identifying the oldest taken branch in the current fetch bundle may be summarized as follows: $T_n$ denotes whether an instruction is a taken branch. $P_n$ denotes whether an instruction is a conditional branch, an unconditional branch, or a return address. $B_n$ denotes the previously discussed BPT counter value, which indicates whether a branch is taken or not taken. Branch logic 150 determines, in parallel, which instructions among fetch instruction 0–7 are branches and whether the branches are taken based on the $P_n$ and $B_n$ values corresponding to each of the fetch instructions, and identifies the oldest taken branch. Hence, it is capable of multiple branch predictions per fetch cycle. As discussed, if the fetch instruction is an unconditional branch or a return instruction, it is always taken. Hence, if the branches in fetch instructions 0–7 are either unconditional branches or return addresses, branch logic can identify the oldest taken branch once it has processed information from the predecode array. If the branches in fetch instructions 0–7 are conditional branches, branch logic will further determine whether these branches are taken or not taken based on the corresponding counter value supplied by BPT 155 to identify the oldest taken branch.

Referring to FIGS. 4A and 4B, if fetch instruction 1 is the oldest taken branch, branch logic 150 will cause NFA0, the target address corresponding to fetch instruction 1, to be fetched from NFAT 135 and cause AGEN 120 to select NFA0 to supply to I$ 125. If fetch instruction 3 is the oldest taken branch, due to aliasing, the target address corresponding to fetch instruction 3 is also NFA0. If fetch instruction 3 is the oldest taken branch, the processor according to the present invention will not stall, as branch logic 150 will cause NFA0, the target address corresponding to branch 3, to be fetched from NFAT 135 and supplied to I$ 125 within the same fetch cycle.

Similarly, if fetch instruction 5 is the oldest taken branch, the processor also will not stall, as branch logic 150 will cause NFA1, the target address corresponding to branch 5, to be fetched from NFAT 135 and supplied to IS 125 within the same fetch cycle. If, for example, branch 5 is a return instruction, upon detecting this, branch logic 150 will provide an input via select input 151 to select the address on top of RAS 165 to AGEN 120. Because a return instruction is also a branch, it also has a corresponding predicted target address, in this case, NFA1. If NFA1 differs from the return address supplied by RAS 165, the address on top of the RAS will be used to repair the NFAT prediction. If either structure mispredicts, the misprediction is repaired by BRT 90. If both fetch instructions 1 and 5 are taken branches, the next fetch address is predicted target address NFA0, as the instruction corresponding to predicted target address NFA1 is irrelevant after fetch instruction 1 is executed.

In the above example, a typical conventional system will stall at branch 5 since it would only have determined whether branch 1 is taken, and the address corresponding to branch 5 will not be fetched until the next fetch cycle. As discussed, the present invention will process the branches in the fetch instructions in parallel and upon identifying the oldest taken branch, will fetch the address corresponding to the branch within the same fetch cycle. Hence, the present invention provides greater processor efficiency over existing systems.

Figure 5C:
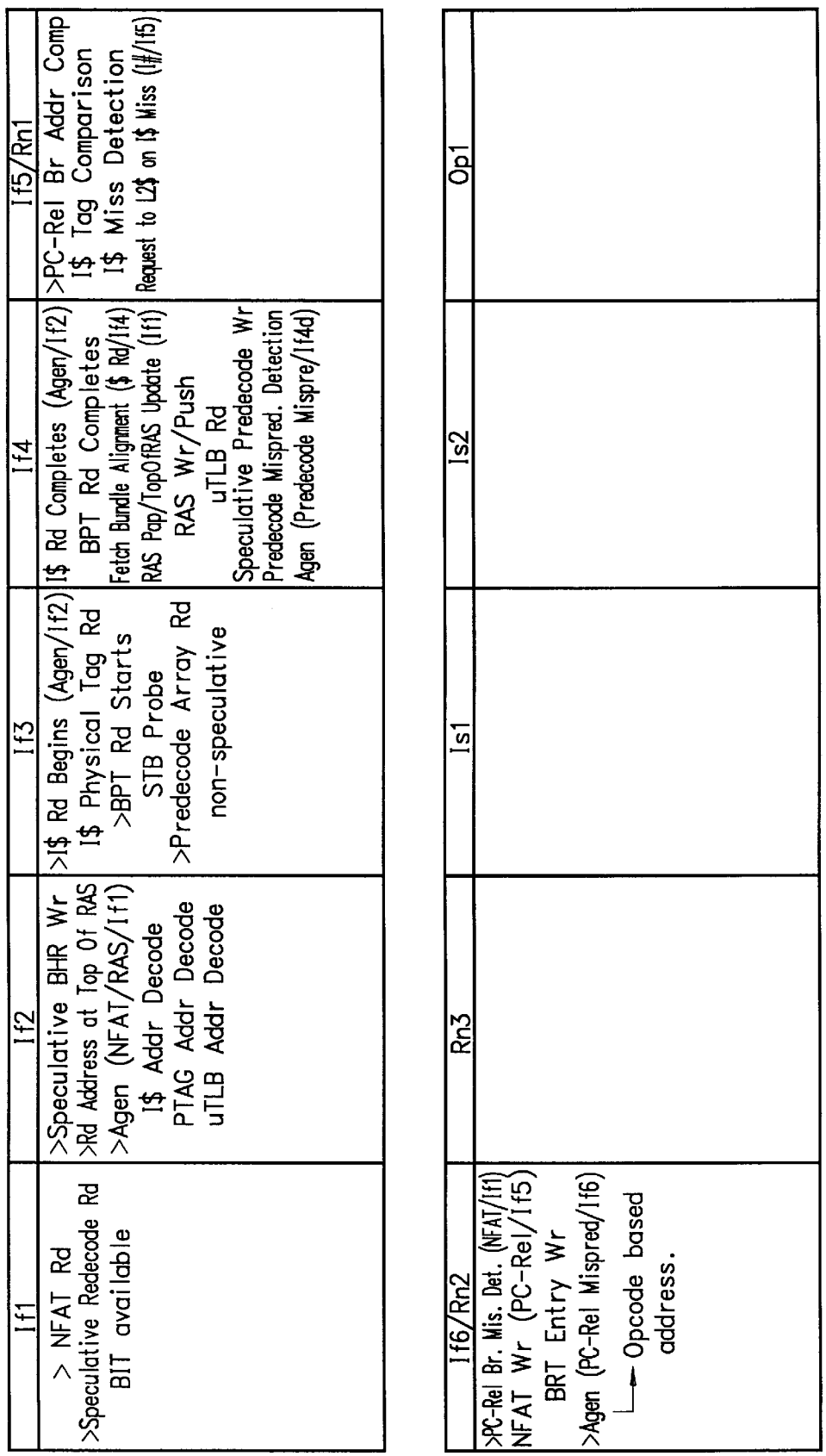
FIG. 5 shows the different stages of the instruction fetch unit pipeline events.

FIG. 5 shows the different stages of the instruction fetch unit pipeline events. As can be seen, in the first instruction fetch pipeline event (If1), reads of NFAT 135 and a speculative predecode are made. In this specific example, the speculative predecode is later verified two cycles later in If3, when predecode array 130 is read. BPT 155 is available, and may also be read in If1.

In If2, the address at the top of RAS 165 is read, and supplied to AGEN 120. As shown, the address from the NFAT read in If1 is also supplied to AGEN 120 in If2. In addition, the speculation made in If1 is written in BHR 160. This information may later be used for improving the branch prediction made by BPT 155. Other functions may be seen in If2; these functions are executed in parallel with the BHR write and RAS read. These functions are not described in detail as they may vary depending on the application, and are not central to the understanding of the present invention.

The BPT read is typically started in If3, although as discussed, the BPT is available in If1. The predecode array address is also read in this stage, hence, the speculative predecode of If1 is verified at this stage. Finally, the I$ read also begins in If3.

In If4, the functions described are related to I$ 125 access, and may be application dependent. Hence, the functions will not be described in detail.

In If5, since the PC relative branch of the target address is encoded in the instruction itself, the instruction decoder can compute the actual address.

As shown in FIG. 5, in If6, the NFAT predicted address is compared with the computed address, and any mispredictions are detected and repaired, and resupplied to AGEN 120.

While the above describes exemplary embodiments of the present invention, it is possible to use various alternatives, modifications and equivalents. For example, while the gshare branch prediction mechanism is shown, any branch predictor may be used with the present invention. Therefore, the scope of the present invention should be determined not with reference to the above description but should, instead, be determined with reference to the appended claims, along with their full scope of equivalents.

What is claimed is:

1. A method for multiple branch prediction per fetch cycle, said method comprising:

providing a current fetch bundle having a plurality of fetch instructions;

determining which ones, if any, of said fetch instructions are branches;

determining which ones, if any of said branch instructions are conditional branch instructions or unconditional branch instructions;

predicting which ones, if any, of said conditional branch instructions are taken; and identifying the oldest taken branch of a plurality of conditional branch instructions in said fetch instructions.

2. The method of claim 1 further comprising fetching the target address corresponding to said identified oldest taken branch.

3. A method for multiple branch prediction per fetch cycle, said method comprising:

providing a current fetch bundle having a plurality of fetch instructions;

determining which ones, if any, of said fetch instructions are branches;

determining which ones of said branch instructions are conditional branch instructions or unconditional branch instructions;

predicting which ones, if any, of said conditional branch instructions are taken;

identifying the oldest taken branch from said conditional branch instructions and from said unconditional branch instructions.

4. The method of claim 3 further comprising fetching the target address corresponding to said identified oldest taken branch.

5. The method of claim 4 further comprising performing said fetching step in the same fetch cycle as providing the current fetch bundle, determining which ones, if any, of said fetch instructions are branches, predicting which ones, if any of said conditional branches are taken, and identifying the oldest taken branch steps.

6. The method of claim 1 further comprising determining in parallel for multiple branch instructions whether the corresponding branches are predicted to be taken.

7. The method of claim 6 wherein determining in parallel for multiple branch instructions whether the corresponding branches are predicted to be taken comprises:

accessing information from a predecode array regarding which instructions are branches;

accessing information from the predecode array regarding which instructions are conditional instructions and which instructions are unconditional instructions; and supplying said informations to said branch logic.

8. The method of claim 7 wherein predicting which ones, if any, of said conditional branch instructions are taken comprises:

reading out multiple entries, in parallel, from a branch prediction table; and predicting whether instructions that have been determined by said predecode array as branch instructions are taken or not taken based on said entries.

9. The method of claim 8 further comprising:

identifying the oldest taken branch based on information received from said predecode array and said branch prediction table; and fetching the target address of said oldest taken branch from a next fetch address table having target address corresponding to said branches.

10. A microprocessor for handling multiple branch predictions per fetch cycle, comprising:

an instruction cache for supplying a plurality of fetch instructions;

a predecode array for determining which ones, if any, of said fetch instructions are branches and for determining which instructions are conditional instructions and which instructions are unconditional instructions;

a branch prediction table for predicting which ones, if any, of said branch instructions are taken;

a branch logic that combines the information from said predecode array and the predictions from said branch prediction table to identify the oldest taken branch; and a next fetch address table that provides the target address corresponding to said identified oldest taken branch.

11. The microprocessor of claim 10 wherein said oldest taken branch is not the first branch instruction in said plurality of fetch instructions.

12. The microprocessor of claim 11 wherein said target address is fetched from said next fetch address table in the same fetch cycle that said microprocessor identifies said oldest taken branch thereby preventing a stall in instruction processing.

13. The microprocessor of claim 11 wherein said current fetch bundle has eight or more instructions.

14. The microprocessor of claim 13 wherein said eight or more instructions may include up to about four branch instructions.

15. The microprocessor of claim 14 wherein said next fetch address table has target addresses corresponding to said branches.

16. The microprocessor of claim 11 wherein said branch logic is capable of handling multiple inputs in parallel.

17. The microprocessor of claim 16 wherein said predecode array has information on which instructions are branches, and supplies said information to said branch logic.

18. The microprocessor of claim 17 wherein said branch prediction table reads out multiple entries in parallel, and wherein said entries predict whether instructions that have been determined by said predecode array as branch instructions are taken or not taken.

19. The microprocessor of claim 18 wherein said branch logic, upon finding the oldest taken branch based on information received from said predecode array and said branch prediction table, fetches the target address of said oldest taken branch from said next fetch address table.

* * * * *